United States Patent Office 3,434,546
Patented Mar. 25, 1969

3,434,546
ROTOR BLADE GRIP BEARING
George L. Rodriguez, Arlington, and Richard W. Pitt, Fort Worth, Tex., assignors to Bell Aerospace Corporation, Wheatfield, N.Y.
Filed Sept. 14, 1966, Ser. No. 579,327
Int. Cl. B64c 11/06, 11/32; F16c 27/02
U.S. Cl. 170—160.58                                5 Claims

ABSTRACT OF THE DISCLOSURE

A full floating sleeve bearing incorporated in the cyclic pitch change bearings for helicopter rotors avoids concentrated wear areas on the bearings and reduces feedback forces to the pilot's controls.

---

Figure 1:
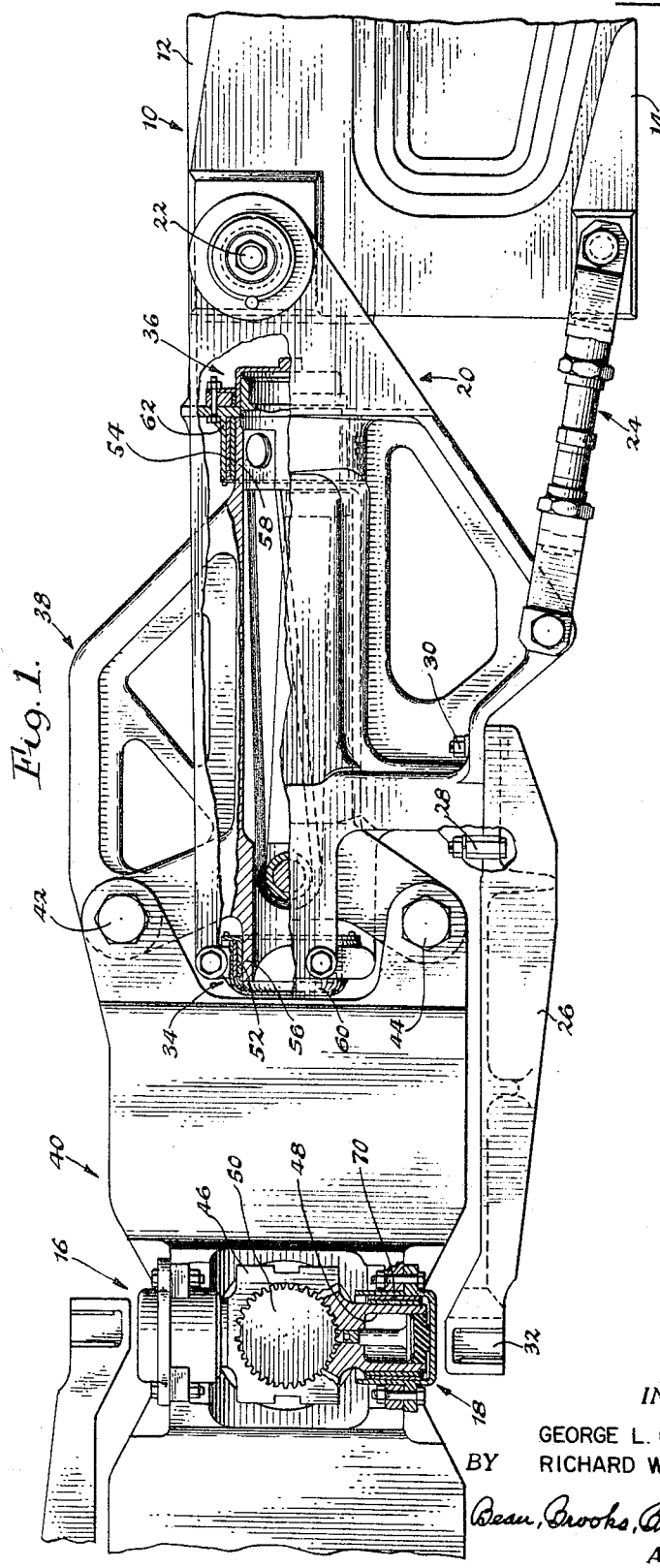

This invention relates to rotary wing aircraft and pertains, more particularly, to certain improvements in bearing assemblies for helicopter rotors.

In helicopter rotor systems generally, considerable difficulty may be encountered in connection with the bearings supporting the rotor blades on the rotor hub. In particular, with larger and heavier rotor blades the utilization of plain bearings or bushings may become impractical due to the heavy loads involved and resort to forced feed lubrication and/or roller or ball bearings may become necessitated. However, even under such circumstances, frequent replacement of the bearings may be required due to the forces imposed upon the bearings and particularly as a result of those forces imposed incidental to cyclic pitch changes required for normal operation of the helicopter.

The present invention is directed in particular to the utiilzation of a floating sleeve bearing in place of the usual bushing or ball or roller bearing employed to mount the blade grip member to the rotor hub about the blade pitch change axis. Surprisingly, it has been found that the utilization of a full floating sleeve bearing as specified greatly reduces the need for maintenance and replacement of these bearings and further that vibrations in the rotor system are substantially reduced as a result of the utilization of such bearings.

It is common in the helicopter art to experience substantial wear on the pitch change axis bearings as aforesaid due primarily to the fact that the motion involved is oscillatory and of fairly limited movement, occurring primarily during cyclic pitch changes imparted to the blade. Because of this oscillatory nature of the blade about its pitch change axis, the pitch change axis bearings normally wear quite rapidly in concentrated areas thereof. With a full floating sleeve bearing according to the present invention, this concentrated wear does not occur but instead, wear occurs more or less uniformly throughout the circumferential extent of the bearing assembly, thus materially lengthening the life of the same and avoiding the frequent maintenance and replacement required with ordinary bearing assemblies. In connection with the vibration problem, although it is not completely understood as to why the vibration characteristics are materially reduced with utilization of the full floating sleeve bearings according to the present invention, it may be that the frictional characteristics of the bearing are more uniform throughout the oscillatory range of the rotor blade than would otherwise be the case with conventional bearings heretofore used. An advantage ancillary to the vibration reduction experienced with the bearings according to the present invention is the fact that stresses are reduced in the control mechanisms and smoother flight characteristics occur due to the fact that the feedback forces to the pilot's controls due to vibration are materially lessened.

Figure 2:
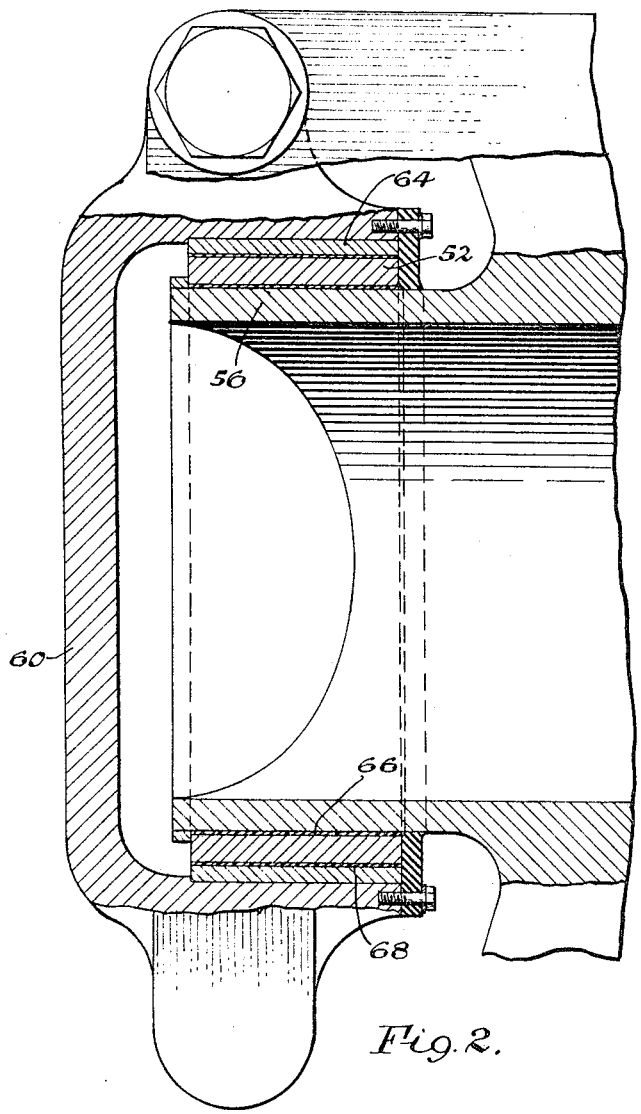

Other objects and advantages of the invention will appear from the specification hereinafter and the accompanying drawing, wherein:

FIG. 1 is a plan view partly in section showing a portion of a rotor assembly constructed in accordance with the present invention; and FIG. 2 is an enlarged sectional view taken through one of the pitch change axis bearings shown in FIGURE 1.

With reference now more particularly to FIGURE 1, the reference numeral 10 therein indicates in general a rotor blade assembly which is of entirely conventional construction and the details of which form no part of the present invention. This rotor blade, in accordance with convention is provided with a leading edge portion 12 and a trailing edge portion 14 and in the particular assembly shown, there are two such rotor blades disposed diametrically opposite each other and mounted to oscillate about a flapping axis defined by trunnion bearings indicated generally by the reference characters 16 and 18. Each blade is provided with a blade grip assembly indicated generally by the reference character 20 which is attached by a suitable pin 22 to the blade and by a suitable strut 24 substantially as is shown, it being appreciated that this particular arrangement of mounting is entirely conventional and is provided to obtain, throught adjustment of the strut 24 to properly orient the blade 10 with respect to the grip member 20. The blade grip 20 carries a pitch control horn 26 which forms in effect a rigid extension of the blade grip, suitable fasteners such as those indicated by reference characters 28 and 30 being provided to rigidly attach the pitch control horn 26 to the blade grip 20. The free end 32 of the pitch control horn 26 is attached to a control rod (not shown) in entirely conventional fashion and it is by means of this control rod and pitch control horn that the pitch change motions are imparted to the rotor blade 10.

The blade grip 20 is provided with a pair of bearing assemblies indicated generally by the reference characters 34 and 36 by means of which the blade grip and consequently the rotor blade 10 are pivotally mounted on the extension 38 of the rotor hub about an axis which extends longitudinally of the rotor blade 10 and about which the pitch change motions occur.

The rotor hub extension 38 is attached to the rotor hub assembly 40 by suitable pins or fasteners 42 and 44 so that these extensions and the main body of the rotor form an integral unit carrying, in its central region, the aforementioned trunnion bearings 16 and 18. The trunnion bearings 16 and 18 are received on the stub shaft portions of the trunnion 46, one of such stub shafts being indicated by the reference character 48 in FIGURE 1. The trunnion 46 is splined or otherwise suitably affixed to the rotor mast or drive shaft 50 which, it will be understood, is suitably powered for rotation by the power plant associated with the helicopter craft.

All of the above mechanism is identical with one form of the invention illustrated and described in conjunction with FIGURE 5 of copending application Ser. No. 454,766, filed Apr. 26, 1965, now Patent No. 3,280,918.

In contrast, however, to the rotor system disclosed in the aforesaid copending application, the present invention utilizes a full floating sleeve bearing for each of the pitch change axis bearings 34 and 36. As is shown in FIGURE 1, then, the sleeves 52 and 54 are full floating with respect to the shaft portions 56 and 58 formed integrally with the extension 38 and with respect to the housing members 60 and 62 which are affixed to and carried by the blade grip assembly 20.

Preferably, the construction is such as is shown in FIGURE 2 wherein it will be seen that the housing member 60 is provided with a stainless steel insert sleeve 64 which provides an internal bearing surface for the full floating sleeve assembly 52 and wherein the shaft portion 56 is also formed of stainless steel. The material of the sleeve 52 may be of any suitable material but the sleeve itself is coated both on its inner surface and its outer surface with fabric reinforced Teflon. The fabric reinforced Teflon is bonded directly to the inner and outer surfaces of the sleeve member 52 and these layers are indicated by the reference characters 66 and 68 respectively in FIGURE 2. The thicknesses of these layers may be in the order of ten or fifteen thousandths of an inch. With this particular construction, it has been found that wear in the bearing, when it occurs, is confined almost solely to the Teflon coating layers 66 and 68 so that for maintainance and replacement, only the sleeve assembly need be replaced. As has been mentioned hereinbefore, in spite of the oscillatory nature of the motion of the blade about its pitch change axis, the utilization of a full floating sleeve bearing as disclosed hereinabove permits the sleeve to rotate a full 360° despite the oscillatory nature of the motion involved and for this reason the wear on the bearing assembly is more or less uniformly distributed throughout the circumference of the same rather than being confined to localized areas as is the case normally with conventional bearing constructions utilized in this position. It will be understood, of course, that suitable seals will be provided to prevent the entry of dirt and other abrasive material into the confines of the bearing assemblies involved.

As has also been mentioned hereinbefore, the reduction in vibrations imparted to the aircraft by the rotor incidental to the cyclic pitch changes involved in the flight of the helicopter are materially reduced and it is conjectured that the reason for this is that the friction attained is more or less uniform throughout the oscillatory range of the rotor blade. That is to say, it will be appreciated of course that the relative velocity between the blade grip and the rotor hub extension 38 during cyclic pitch change motion is sinusoidal in nature and it is believed that the bearing characteristics of the full floating sleeve bearing disclosed herein achieves a greater uniformity in frictional characteristics during this sinusoidal motion than is otherwise achieved by conventional bearings.

The trunnion bearings 16 and 18 may also be provided with full floating sleeve bearings such as that indicated by the reference character 70 in FIGURE 1.

It will be appreciated that a plurality of floating sleeves may be used as opposed to the single floating sleeve illustrated and described. Also, it will be apparent that the bearing material may be affixed to any available surface. That is, it may be wholly associated with the floating sleeve as is the case for the illustrated example, it may be on only one surface of the sleeve, or it may be on neither surface of the sleeve. In the latter two cases, the bearing material would be located, instead, on the inner and/or outer race members 56 and 64.

It will be appreciated that whereas only one form of the invention has been illustrated and described in detail herein, various changes may be made therein without departing from the spirit of the invention or the scope of the following claims.

We claim:
1. In a rotor system for helicopters,
a rotor blade assembly including at least one rotor blade, a hub for said blade and bearing means pivotally mounting said blade on said hub for pitch change motions relative thereto,
means for rotating the hub and blade,
cyclic pitch control means connected to said blade for cyclically oscillating said blade relative to said hub,
the improvement consisting of bearing means pivotally mounting said blade on said hub for movement about the pitch change axis, said bearing means comprising concentric bearing portions on said blade and said hub and a floating bearing sleeve interposed between said bearing portions.
2. In a rotor system for helicopters, in combination,
a rotor hub,
means for rotating said hub about a predetermined axis,
a rotor blade,
bearing means mounting said blade upon said hub for pivotal motion relative thereto about a pitch change axis extending generally longitudinally of the blade and substantially radially with respect to said predetermined axis,
means for cyclically oscillating said blade relative to said hub about said pitch change axis,
said bearing means comprising a floating bearing sleeve interposed between said hub and said blade.
3. The rotor system as defined in claim 2 wherein said bearing sleeve bears directly against said hub and blade.
4. In the rotor system as defined in claim 3 wherein said bearing sleeve comprises a rigid cylindrical main body portion provided on its inner and outer surfaces with a coating of Teflon.
5. In the rotor system as defined in claim 1 wherein said bearing sleeve comprises a rigid cylindrical main body portion provided on its inner and outer surfaces with a coating of Teflon.

References Cited

UNITED STATES PATENTS

| 3,200,887 | 8/1965 | Ballauer | 170—160.25 |
| 3,280,918 | 10/1966 | Drees et al. | 170—160.58 |

FOREIGN PATENTS

| 1,147,386 | 6/1957 | France. |
| 876,435 | 8/1961 | Great Britain. |

EVERETTE A. POWELL, JR., *Primary Examiner.*